US008826076B2

(12) United States Patent
Brinkman et al.

(10) Patent No.: US 8,826,076 B2
(45) Date of Patent: *Sep. 2, 2014

(54) VISUALLY MARKING FAILED COMPONENTS

(75) Inventors: Michael G. Brinkman, Raleigh, NC (US); Nathan C. Skalsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,466

(22) Filed: Mar. 21, 2012

(65) Prior Publication Data

US 2012/0192019 A1     Jul. 26, 2012

Related U.S. Application Data

(63) Continuation of application No. 12/773,438, filed on May 4, 2010, now Pat. No. 8,185,780.

(51) Int. Cl.
*G06F 11/00* (2006.01)
(52) U.S. Cl.
USPC ............................... 714/25; 714/48; 73/865.8
(58) Field of Classification Search
USPC ................. 714/25, 48; 73/865.8; 324/759.02, 324/759.03
See application file for complete search history.

(56) References Cited

U.S. PATENT DOCUMENTS

| 4,194,113 | A | | 3/1980 | Fulks et al. |
| 4,753,863 | A | * | 6/1988 | Spanjer ........................ 430/138 |
| 4,872,052 | A | | 10/1989 | Liudzius et al. |
| 5,121,475 | A | | 6/1992 | Child et al. |
| 5,208,132 | A | | 5/1993 | Kamada et al. |
| 5,289,547 | A | | 2/1994 | Ligas et al. |
| 5,673,028 | A | | 9/1997 | Levy |
| 5,837,042 | A | * | 11/1998 | Lent et al. ................... 106/31.14 |
| 5,928,842 | A | * | 7/1999 | Shinmoto et al. ............. 430/346 |
| 5,985,377 | A | * | 11/1999 | Corbett ......................... 427/511 |
| 6,218,852 | B1 | | 4/2001 | Smith et al. |
| 6,358,776 | B1 | | 3/2002 | Takehara et al. |
| 6,396,295 | B1 | * | 5/2002 | Robinson et al. ........ 324/750.03 |
| 6,408,253 | B2 | | 6/2002 | Rosenberg et al. |
| 6,487,623 | B1 | | 11/2002 | Emerson et al. |
| 6,524,881 | B1 | * | 2/2003 | Tandy et al. ..................... 438/69 |
| 6,694,831 | B2 | * | 2/2004 | Assimos et al. ............. 73/865.8 |

(Continued)

FOREIGN PATENT DOCUMENTS

| JP | 2000/125754 | 4/2000 |
| JP | 2001308599 A2 | 11/2001 |
| WO | WO 2009/082389 A1 | 7/2009 |

OTHER PUBLICATIONS

Wikipedia's DIMM version from Feb. 26, 2009 http://en.wikipedia.org/w/index.php?title=DIMM&oldid=273412945.*

*Primary Examiner* — Joseph Schell
(74) *Attorney, Agent, or Firm* — Edward J. Lenart; Katherine S. Brown; Biggers Kennedy Lenart Spraggins LLP (57) ABSTRACT

Methods, apparatus, and products for visually marking computing components within a computing system are disclosed that include: detecting that a particular computing component has failed, wherein the particular computing component has a physical surface that may be altered with the application of some physical stimulus; and applying a requisite physical stimulus to the physical surface such that the appearance of the physical service is altered, thereby visually identifying that the component has failed.

13 Claims, 4 Drawing Sheets

(56) References Cited

U.S. PATENT DOCUMENTS

| | | | |
|---|---|---|---|
| 6,756,907 B2 | 6/2004 | Hollaway | |
| 7,014,895 B1 * | 3/2006 | Grotefend et al. | 428/32.81 |
| 7,020,582 B1 * | 3/2006 | Dicosola et al. | 702/185 |
| 7,038,766 B2 | 5/2006 | Kerns et al. | |
| 7,452,732 B2 * | 11/2008 | Corbett | 438/5 |
| 7,599,544 B2 | 10/2009 | Moshe | |
| 7,624,301 B2 * | 11/2009 | Yamaguchi et al. | 714/5.11 |
| 2002/0030732 A1 * | 3/2002 | Corbett | 347/224 |
| 2002/0084779 A1 | 7/2002 | Shigeta | |
| 2008/0065928 A1 | 3/2008 | Suzuki et al. | |
| 2008/0068855 A1 | 3/2008 | Goldman et al. | |
| 2008/0148109 A1 * | 6/2008 | Bashor et al. | 714/57 |
| 2008/0266141 A1 * | 10/2008 | Bharadwaj et al. | 340/945 |
| 2010/0031092 A1 | 2/2010 | Dokken et al. | |
| 2010/0237891 A1 * | 9/2010 | Lin et al. | 324/763 |
| 2011/0276841 A1 | 11/2011 | Brinkman et al. | |

* cited by examiner

VISUALLY MARKING FAILED COMPONENTS

CROSS-REFERENCE TO RELATED APPLICATION

This application is a continuation application of and claims priority from U.S. patent application Ser. No. 12/773,438, filed on May 4, 2010.

BACKGROUND OF THE INVENTION

1. Field of the Invention

The field of the invention is data processing, or, more specifically, methods, apparatus, and products for visually marking failed components.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems include replaceable components such as, for example, a dual in-line memory module ('DIMM'), a single in-line memory module ('SIMM'), a central processing unit ('CPU'), expansion cards, and so on. Such components may fail in the sense that the components are completely inoperable or otherwise unable to function properly. Upon detecting that a particular component has failed a system administrator may replace the failed component with a new component. Identifying the particular component that has failed may be challenging, however, as evidenced by the fact that fully functional components are often removed by mistake.

SUMMARY OF THE INVENTION

Methods, apparatus, and products for visually marking failed components are disclosed that include detecting, by a component distinguishing module, that a computing component has failed, wherein the computing component includes a physical surface for identifying that the component has failed and marking, by the component distinguishing module, the physical surface with a predetermined mark identifying that the component has failed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
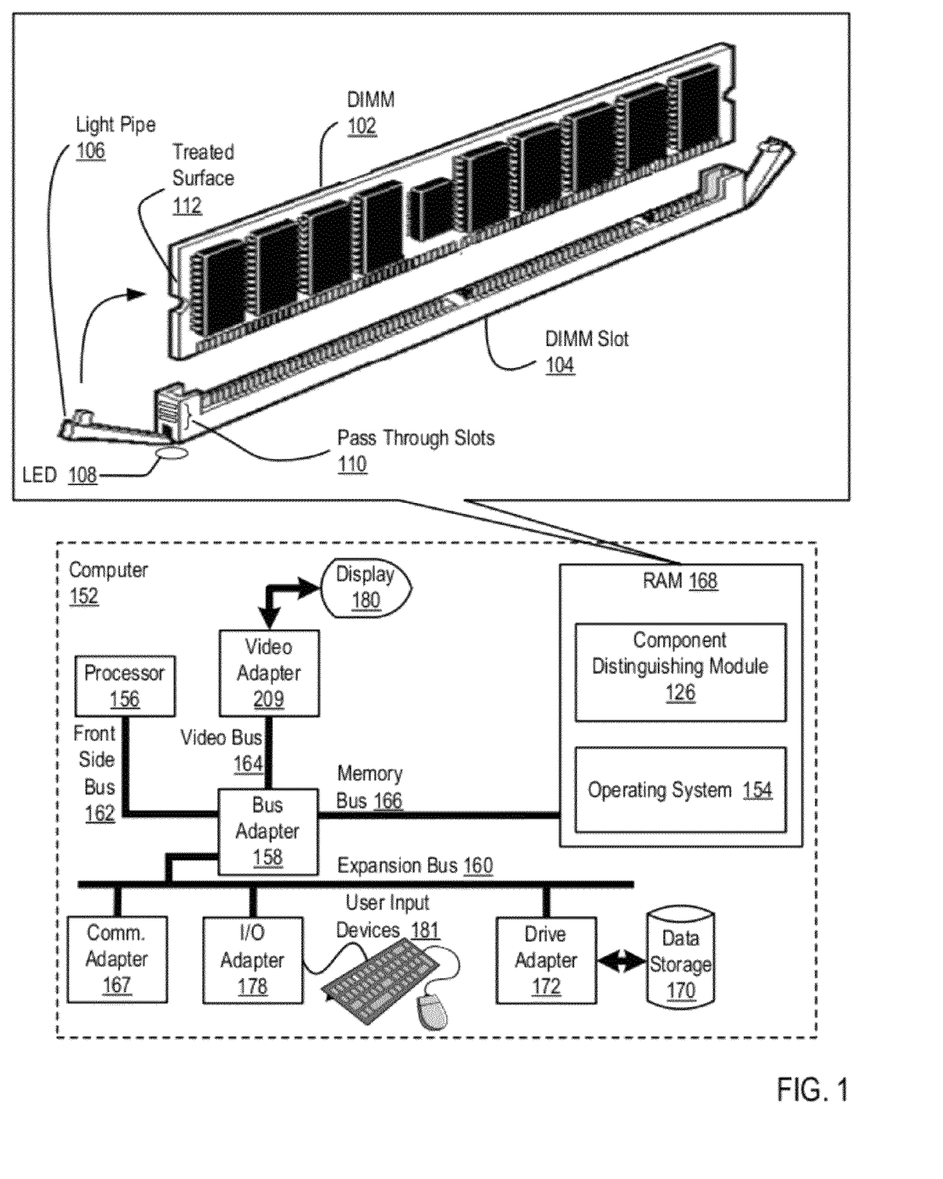
FIG. 1 sets forth a block diagram of a system for visually marking failed components.

Exemplary methods, apparatus, and products for visually marking failed components in accordance with the present invention are described with reference to the accompanying drawings, beginning with FIG. 1. FIG. 1 sets forth a block diagram of a system for visually marking failed components according to embodiments of the present invention. The system of FIG. 1 includes an exemplary computer (152) useful in visually marking failed components according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

In the example of FIG. 1, RAM (168) may include one or more memory modules such as, for example, a dual in-line memory module ('DIMM') (102). The DIMM (102) is a removable memory module that includes dynamic random access memory integrated circuits. The DIMM (102) of FIG. 1 also includes a treated surface (112). In the example of FIG. 1, the treated surface (112) may be treated with a material whose color changes when contacted by light such as, for example, an ultraviolet ('UV') photochromic ink solution whose appearance changes when exposed to UV wavelength light. As such, when the treated surface (112) of the DIMM (102) is exposed to light, the appearance of the treated surface will be altered in response to it's exposure to light.

The DIMM (102) of FIG. 1 may be mounted on a printed circuit board via a DIMM slot (104) configured to receive the DIMM (102). In the example of FIG. 1, the DIMM slot (104) is connected to a light pipe (106) configured to latch to the DIMM (102) when the DIMM (102) is inserted into the DIMM slot (104). In the example of FIG. 1, the light pipe (106) is configured receive light emitted from a light-emitting diode ('LED') (108). The light pipe (106) of FIG. 1 may include, for example, a cavity within which light emitted from the LED (108) can travel. Light received via the light pipe (108) may also pass through the pass through slots (110) which are openings on the DIMM slot (104). Light emitted from the LED (108) may therefore contact the treated surface (112) of the DIMM (102) via the light pipe (106) and the pass through slots (110) thereby causing the appearance of the treated surface (112) of the DIMM (102) to be altered.

Stored in RAM (168) is a component distinguishing module (126), a module of computer program instructions for visually marking failed components according to embodiments of the present invention. The component distinguishing module (126) may carry out visually marking failed components by detecting that a computing component has failed, wherein the computing component includes a physical surface for identifying that the component has failed and marking, by the component distinguishing module, the physical surface with a predetermined mark identifying that the component has failed. In the example of FIG. 1, the component distinguishing module (126) may detect that the DIMM (102) has failed. The DIMM (102) of FIG. 1 includes a treated surface (112) that can serve as a physical surface for identifying that the component has failed. In such an example, the component distinguishing module (126) may mark the physical surface with a predetermined mark identifying that the component has failed by, for example, causing the LED (108) to become illuminated such that light is passed to the treated surface (112) via the light pipe (106) and the pass through slots (110), thereby causing the physical appearance of the treated surface (112) to be altered.

Also stored in RAM (168) is an operating system (154). Operating systems useful visually marking failed components according to embodiments of the present invention include UNIX™, Linux™, Microsoft XP™, AIX™, IBM's i5/OS™, and others as will occur to those of skill in the art. The operating system (154) and component distinguishing module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for visually marking failed components according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for visually marking failed components according to embodiments of the present invention include modems for wired dial-up communications, Ethernet (IEEE 802.3) adapters for wired data communications network communications, and 802.11 adapters for wireless data communications network communications.

Figure 2:
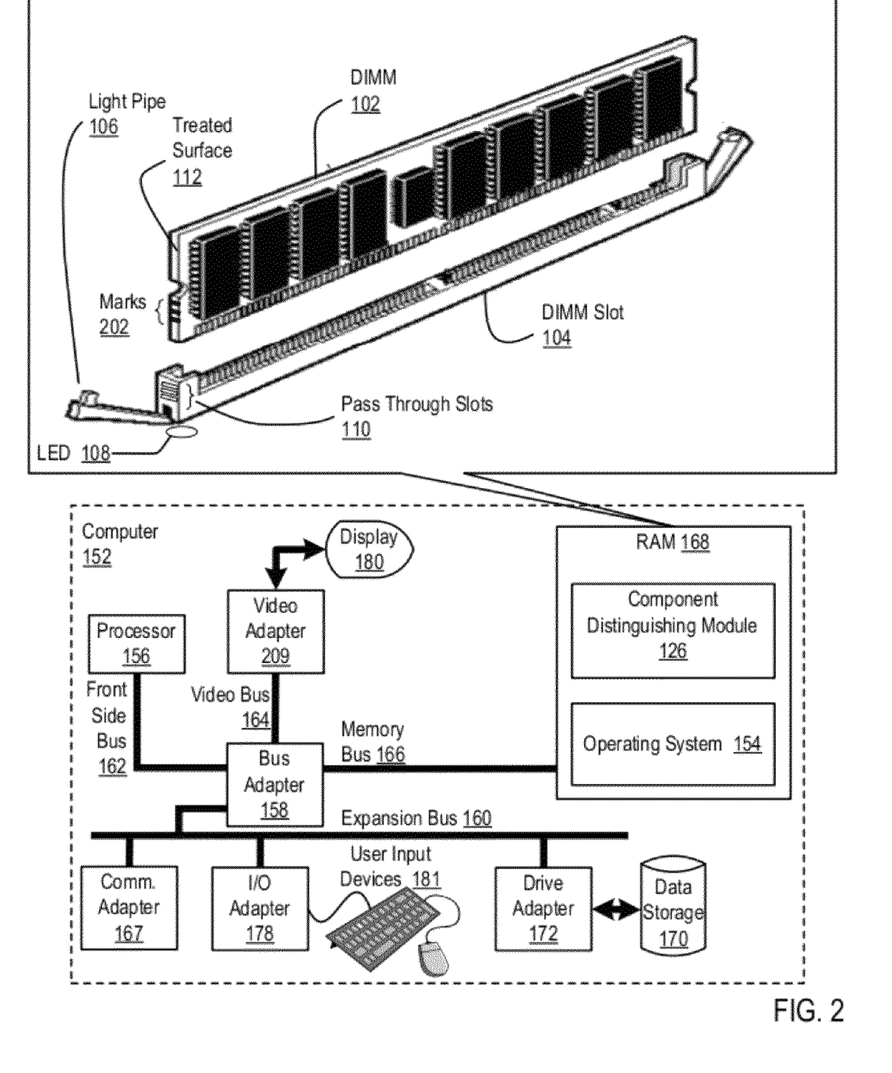
FIG. 2 sets forth a block diagram of a system for visually marking failed components.

For further explanation, FIG. 2 sets forth a block diagram of a system for visually marking failed components according to embodiments of the present invention. The system of FIG. 2 is similar to the system of FIG. 1, including as it does the exemplary computer (152) and all of the computer's (152) component parts as described above with reference to FIG. 1. In the example of FIG. 2, however, the treated surface (112) of the DIMM (102) includes marks (202). The marks (202) of FIG. 2 are included to illustrate the effect of marking, by the component distinguishing module, the physical surface of a failed component with a predetermined mark identifying that the component has failed. In the example of FIG. 2, the marks (202) correspond to a pattern that would be expected from passing light from the LED (108) through the light pipe (106) and the pass through slots (110) given that the marks (202) are geometrically similar to the pass through slots (110). Because the marks (202) are geometrically similar to the pass through slots (110), it can be deduced that the marks (202) were created as the result of illuminating the LED (108), which only occurs upon detecting that the SIMM (102) has failed. As such, the defective SIMM (102) now includes a visible mark to assist a system administrator in identifying a component that has failed. In contrast, if the marks (202) were composed of a single mark that spanned the entire treated surface (112) of the DIMM (102), such a mark could indicate that the entire DIMM (102) had been exposed to light (not just exposed to light passed through the pass through slots (110)) and therefore the marks (202) would not be indicative that the DIMM (102) had been identified as a component that had failed.

In the examples of FIG. 1 and FIG. 2, the computing component that is visually marked is described as a DIMM (102). This is for explanation and not intended to serve as a limitation. In fact, the computing component that is marked may be a SIMM, a CPU, an expansion card, expansion slots, or any other component part of a computing device as will occur to those of skill in the art. Furthermore, in the examples of FIG. 1 and FIG. 2, visually marking failed components is discussed only in the context of delivering light to a treated surface (112) whose appearance changes in response to exposure to light. This is for explanation and not intended to serve as a limitation.

Visually marking failed components according to embodiments of the present application may also be carried out by using any surface whose appearance can be altered by receiving a physical stimulus. For example, visually marking failed components may be carried out by delivering heat to a treated surface whose appearance changes when exposed to heat, by delivering an electrical current to a treated surface whose appearance changes when exposed to an electrical current, by delivering chemical compound to physical surface whose appearance changes when exposed the chemical compound, by delivering a force to a physical surface whose appearance changes when exposed the physical force, or in any other way as will occur to those of skill in the art. Visually marking a failed component may also be carried out by delivering physical stimulus to more than one surface. In addition, visually marking failed components may also be carried out by delivering light through one of a plurality of light pipes that is selected in dependence upon the nature of a component failure. For example, light may be delivered via a first pipe when a read operation failed and light may be delivered via a second pipe when a write operation failed, such that a particular section of the failed component is marked, thereby visually distinguishing between different types of component failure. In other examples, each light pipe may also be geometrically distinct such that light exiting a first light pipe a mark, such as a circle, that is visually distinct from a mark that is left by light exiting a second light pipe, such as a square.

Figure 3:
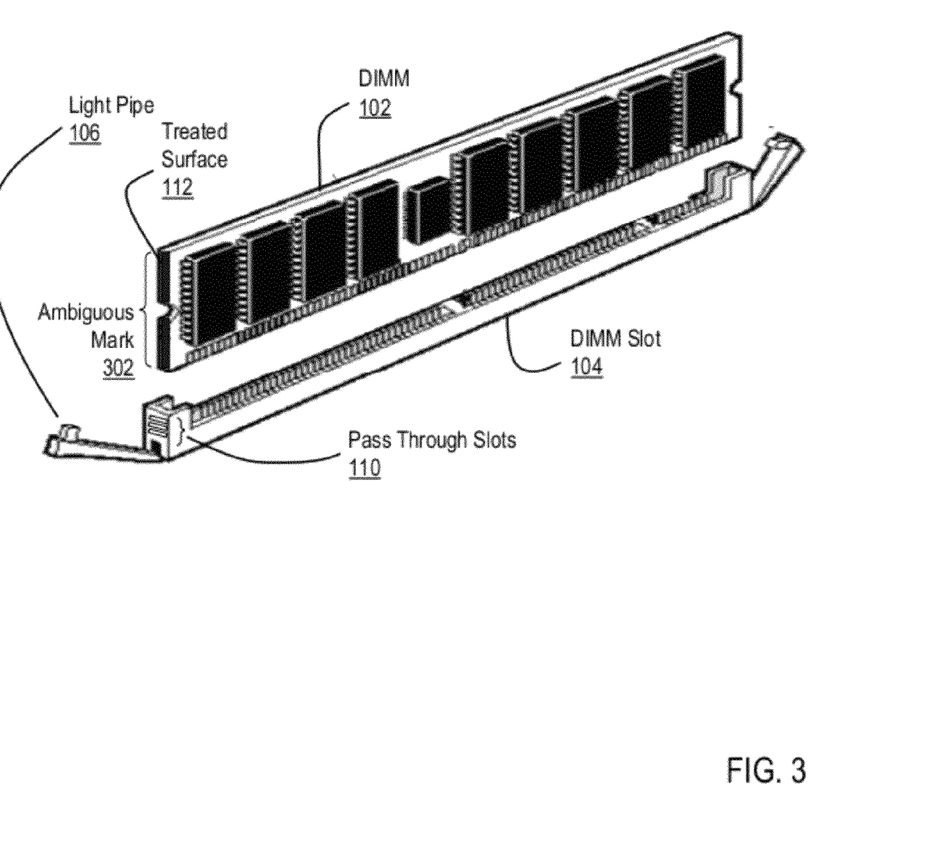
FIG. 3 sets forth a block diagram of a visually marked component.

For further explanation, FIG. 3 depicts a block diagram of a visually marked component. In the example of FIG. 3, the visually marked component is a DIMM (102) that is similar to the DIMMs described above with reference to FIG. 1 and FIG. 2. The DIMM (102) of FIG. 3 includes a treated surface (112) and may be mounted within a DIMM slot (104) that includes pass through slots (110) for delivering light via a light pipe (106) to the treated surface (112) of the DIMM (102) as described above. In the example of FIG. 3, the DIMM (102) includes an ambiguous mark (302) in the sense that the entire treated surface (112) has been exposed to light and the visual appearance of the entire treated surface (112) has therefore been altered. The entire treated surface (112) of FIG. 3 may have been exposed to light, for example, if the DIMM (102) was set out on a surface and exposed to sunlight. Such an ambiguous mark (302) is 'ambiguous' in the sense that it cannot be visually determined if the DIMM (102) has failed by simply examining the treated surface (112). For example, the treated surface (112) of the DIMM (102) may have been exposed to light via the pass through slots (110). Because the entire treated surface (112) has been exposed to light, however, markings that would have resulted from delivering light through the pass through slots (110) are now indistinguishable from the remainder of the treated surface (112) due to the fact that the entire treated surface (112) was exposed to light.

Figure 4:
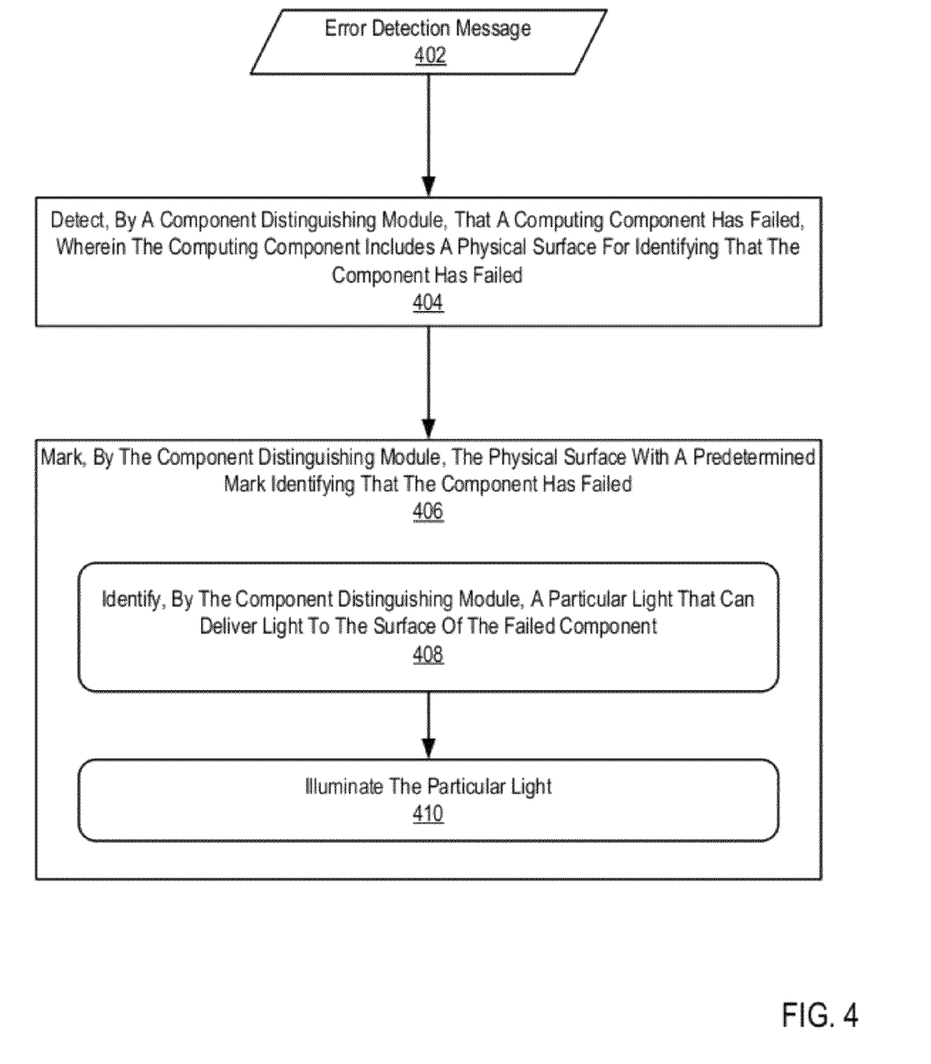
FIG. 4 sets forth a flow chart illustrating an exemplary method for visually marking failed components.

For further explanation, FIG. 4 sets forth a flow chart illustrating an exemplary method for visually marking failed components according to embodiments of the present invention. Such components may include, for example, a DIMM, a SIMM, a CPU, an expansion card, or any other component part of a computing device. The example of FIG. 4 include includes detecting (404), by a component distinguishing module, that a computing component has failed. Detecting that a computing component has failed may be carried out, for example, by receiving an error message (402) when attempting to access the computing component. In the example of FIG. 4, such error messages (402) may be embodied, for example, as an error message generated by an operating system indicating that a component is not found, not properly configured, that a particular operation was not successfully performed, that a component has overheated, that a component performed some unexpected operation, and so on.

In the example of FIG. 4, the computing component includes a physical surface for identifying that the component has failed. In the example of FIG. 4, the physical surface for identifying that the component has failed may be composed of material that irreversibly turns a particular color when exposed to light such as, for example, an irreversible UV photochromic ink solution whose appearance changes when exposed to UV wavelength light. The physical surface for identifying that the component has failed may further be embodied, for example, as a material whose appearance changes in response to exposure to heat, as a material whose appearance changes in response to exposure to an electrical current, or any other surface whose appearance may change in response to physical stimulus.

The example of FIG. 4 also includes marking (406), by the component distinguishing module, the physical surface with a predetermined mark identifying that the component has failed. Marking (406) the physical surface with a predetermined mark may be carried out by applying a physical stimulus that changes the appearance of physical surface to the physical surface. For example, marking the physical surface with a predetermined mark may be carried out by exposing the surface to light via a light source, by exposing the surface to heat via a heat source, by exposing the surface to electrical current via an electrical current source, and so on.

In the example of FIG. 4, marking (406) the physical surface with a predetermined mark may include identifying (408), by the component distinguishing module, a particular light that can deliver light to the surface of the failed component and illuminating (410) the particular light. In the example of FIG. 4, identifying (408), by the component distinguishing module, a particular light that can deliver light to the surface of the failed component may be carried out, for example, through the use of a lookup table that associates a particular component with a particular light source capable of delivering light to the particular component. For example, a motherboard may have a first, second, third, and fourth DIMM slot for receiving four DIMMs. Such a motherboard may also include a first, second, third, and fourth LED capable of delivering light to the respective DIMMs. In such an example, if the component distinguishing module determines that the DIMM mounted in the third DIMM slot has failed, the component distinguishing module may illuminate the third LED such that the third LED delivers light to the third DIMM slot, thereby causing the appearance of the physical surface to be altered in response to being exposed to light.

In the example of FIG. 4, illuminating (410) the particular light may be carried out, for example, using an LED control module configured to control the operation of the LED. The LED control module may include computer program instructions configured to, for example, power up a power supply that is connected to a particular LED, thereby causing the LED to become illuminated. Readers of skill in the art will recognize that there are a variety of implementations available to control the operation of an LED, all of which are within the scope of the present application.

Exemplary embodiments of the present invention are described largely in the context of a fully functional computer system for visually marking failed components. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of visually marking failed components, the method comprising:
    detecting, by a component distinguishing module, that a computing component has failed, wherein the computing component includes a physical surface having a predefined location on the computing component for identifying that the computing component has failed, wherein the physical surface for identifying that the component has failed is composed of material that irreversibly turns a particular color when exposed to light, wherein the material that irreversibly turns a particular color when exposed to light is an irreversible ultraviolet ('UV') photochromic ink solution; and
    marking, by the component distinguishing module, the physical surface with a predetermined mark identifying that the computing component has failed, including irreversibly changing the color of some portion of the physical surface.

2. The method of claim 1 wherein detecting, by a component distinguishing module, that a computing component has failed further comprises receiving, by the component distinguishing module, an error detection message when attempting to access the computing component.

3. The method of claim 1, wherein marking, by the component distinguishing module, the physical surface with a predetermined mark identifying that the computing component has failed further comprises:
  identifying, by the component distinguishing module, a particular light source that can deliver light to the surface of the computing component that has failed; and
  illuminating the particular light source.

4. The method of claim 1 wherein the computing component is a dual in-line memory module ('DIMM').

5. Apparatus for visually marking failed components, the apparatus comprising a computer processor, a computer memory operatively coupled to the computer processor, the computer memory having disposed within it computer program instructions for:
  detecting, by a component distinguishing module, that a computing component has failed, wherein the computing component includes a physical surface having a predefined location on the computing component for identifying that the computing component has failed, wherein the physical surface for identifying that the component has failed is composed of material that irreversibly turns a particular color when exposed to light, wherein the material that irreversibly turns a particular color when exposed to light is an irreversible ultraviolet ('UV') photochromic ink solution; and
  marking, by the component distinguishing module, the physical surface with a predetermined mark identifying that the computing component has failed, including irreversibly changing the color of some portion of the physical surface.

6. The apparatus of claim 5 wherein the computer program instructions for detecting, by a component distinguishing module, that a computing component has failed further comprise computer program instructions for receiving, by the component distinguishing module, an error detection message when attempting to access the computing component.

7. The apparatus of claim 5 wherein the computer program instructions for marking, by the component distinguishing module, the physical surface with a predetermined mark identifying that the computing component has failed further comprise:
  computer program instructions for identifying, by the component distinguishing module, a particular light source that can deliver light to the surface of the computing component that has failed; and
  computer program instructions for illuminating the particular light source.

8. The apparatus of claim 5 wherein the computing component is a dual in-line memory module ('DIMM').

9. A computer program product for visually distinguishing failed computing components from operational computing components, the computer program product disposed upon a computer readable storage medium, wherein the computer readable storage medium is not a signal, the computer program product comprising computer program instructions that, when executed, cause a computer to carry out the steps of:
  detecting, by a component distinguishing module, that a computing component has failed, wherein the computing component includes a physical surface having a predefined location on the computing component for identifying that the computing component has failed, wherein the physical surface for identifying that the component has failed is composed of material that irreversibly turns a particular color when exposed to light, wherein the material that irreversibly turns a particular color when exposed to light is an irreversible ultraviolet ('UV') photochromic ink solution; and
  marking, by the component distinguishing module, the physical surface with a predetermined mark identifying that the computing component has failed, including irreversibly changing the color of some portion of the physical surface.

10. The computer program product of claim 9 wherein the computer program instructions for detecting, by a component distinguishing module, that a computing component has failed further comprise computer program instructions for receiving, by the component distinguishing module, an error detection message when attempting to access the computing component.

11. The computer program product of claim 9 wherein the computer program instructions for marking, by the component distinguishing module, the physical surface with a predetermined mark identifying that the computing component has failed further comprise:
  computer program instructions for identifying, by the component distinguishing module, a particular light source that can deliver light to the surface of the computing component that has failed; and
  computer program instructions for illuminating the particular light source.

12. The computer program product of claim 9 wherein the computing component is a dual in-line memory module ('DIMM').

13. A dual in-line memory module ('DIMM') that includes a physical surface having a predefined location on the DIMM for identifying that the DIMM has failed, wherein the physical surface comprises a printed circuit board ('PCB') substrate and the appearance of the physical surface irreversibly changes when a physical stimulus is applied to the physical surface, wherein the physical surface includes an irreversible ultraviolet ('UV') photochromic ink solution that changes colors when exposed to light.

* * * * *